(12) United States Patent
Kuai et al.

(10) Patent No.: US 9,929,875 B2
(45) Date of Patent: Mar. 27, 2018

(54) DETECTION SYSTEM AND METHOD AND SPACE CONTROL SYSTEM USING SUCH A DETECTION SYSTEM

(71) Applicant: PHILIPS LIGHTING HOLDING B.V., Eindhoven (NL)

(72) Inventors: Shuguang Kuai, Shanghai (CN); Guofu Zhuo, Best (NL); Mark Christoph Jaeger, Veldhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 21 days.

(21) Appl. No.: 15/025,093

(22) PCT Filed: Sep. 11, 2014

(86) PCT No.: PCT/EP2014/069336
§ 371 (c)(1),
(2) Date: Mar. 25, 2016

(87) PCT Pub. No.: WO2015/043960
PCT Pub. Date: Apr. 2, 2015

(65) Prior Publication Data
US 2016/0241416 A1 Aug. 18, 2016

(30) Foreign Application Priority Data

Sep. 25, 2013 (WO) ................ PCT/CN2013/001137
Oct. 29, 2013 (EP) ...................................... 13190728

(51) Int. Cl.
*G06K 9/00* (2006.01)
*H04L 12/28* (2006.01)
(Continued)

(52) U.S. Cl.
CPC ...... *H04L 12/2829* (2013.01); *G06K 9/00335* (2013.01); *G06T 7/262* (2017.01);
(Continued)

(58) Field of Classification Search
CPC .............. G06K 9/00; G06T 7/00; H04L 12/00
(Continued)

(56) References Cited

U.S. PATENT DOCUMENTS 6,384,414 B1 * 5/2002 Fisher ....................... G01J 5/08
250/339.05
2004/0183679 A1 9/2004 Paximadis et al.
(Continued)

FOREIGN PATENT DOCUMENTS

EP 2390851 A1 11/2011
JP 2006101384 A 4/2006

OTHER PUBLICATIONS

Correa, Mauricio, et al., "Human Detection and Identification by Robots Using Thermal and Visual Information in Domestic Environments," J. Intell. Robot Syst. (2012) (21 pages).
(Continued)

*Primary Examiner* — Abolfazl Tabatabai
(74) *Attorney, Agent, or Firm* — Meenakshy Chakravorty

(57) ABSTRACT

A space control system and a detection system are disclosed. The detection system is configured for distinguishing a moving living object, e.g. a human being, from a moving machine object in a space. The system comprises an imaging apparatus configured for producing a plurality of images over time of at least a part of the space. The images have a good spatial resolution. The system also comprises a processor configured for determining motion signals of the moving living object and the moving machine object from the plurality of images. The processor is configured to transform the motion signals to a frequency domain and distinguish in the frequency domain between motion signals related to moving living objects and motion signals related to the moving machine objects. Accordingly, the system is enabled to detect at least one of the living object and the
(Continued)

machine object in the part of the space on the basis of the distinguished motion signals.

14 Claims, 5 Drawing Sheets

(51) Int. Cl.
    *G08B 13/19*     (2006.01)
    *G08B 13/196*     (2006.01)
    *G06T 7/262*     (2017.01)
    *H04N 5/225*     (2006.01)

(52) U.S. Cl.
    CPC ....... *G08B 13/19* (2013.01); *G08B 13/19606* (2013.01); *G06T 2207/30196* (2013.01); *H04L 2012/285* (2013.01)

(58) Field of Classification Search
    USPC .......... 382/103, 107, 236; 348/169–172, 352
    See application file for complete search history.

(56) References Cited

U.S. PATENT DOCUMENTS

2006/0145824 A1* 7/2006 Frenzel ................. G01S 17/026
    340/426.26
2011/0254952 A1* 10/2011 Wagner .................. G01N 25/72
    348/135

OTHER PUBLICATIONS

Meng, Q., et al., "Recognition of Human Periodic Movements From Unstructured Information Using a Motion-Based Frequency Domain Approach," Image and Vision Computing 24 (2006) (15 pages).
Han, Ju, et al., "Human Activity Recognition in Thermal Infrared Imagery," IEEE Computer Society Conference on Computer Vision and Pattern Recognition (2005) (8 pages).
Ren, Ying, et al., "Motion Detection With Nonstationary Background," Machine Vision and Applications (2003) (12 pages).
Tian, Ying-Li, et al., "Robust Salient Motion Detection With Complex Background for Real-Time Video Surveillance," IEEE Workshop on Motion and Video Computing (2005) (6 pages).

* cited by examiner

DETECTION SYSTEM AND METHOD AND SPACE CONTROL SYSTEM USING SUCH A DETECTION SYSTEM

CROSS-REFERENCE TO PRIOR APPLICATIONS

This application is the U.S. National Phase application under 35 U.S.C. § 371 of International Application No. PCT/EP2014/069336, filed on Sep. 11, 2014, which claims the benefit of Application No. PCT/CN2013/001137, filed on Sep. 25, 2013 and European Patent Application No. 13190728.9, filed on Oct. 29, 2013. These applications are hereby incorporated by reference herein.

FIELD OF THE INVENTION

The present invention relates to the field of detection systems and control systems. More in particular, the invention relates to a detection system, such as for detection of human beings or animals, and control systems for space elements of a space, such as lighting elements, wherein the control is based on the detection results.

BACKGROUND OF THE INVENTION

Energy saving in the working environment is essential to build a green world and is increasingly enforced by regulations. In some working environments, such as manufacturing environments, robots are used to improve productivity. Human workers work along with these robots during particular times of the day. At other times, the robots operate without the presence of human workers.

Working space requirements may be (very) different for human workers and robots. For example, human workers require and appropriate amount of light in order to have proper vision to perform their jobs, whereas robots may operate under low light conditions or even completely in the dark. Other requirements, such as ventilation and heating requirements, may differ between human workers and robots as well.

In order to control space elements responsible for setting the conditions in the working space, detectors may be used in the working space to determine whether or not human workers are present. When human workers are detected, the space elements are controlled to fulfill the working requirements (e.g. illumination and/or temperature) for human workers in the working space. When no human workers are detected, the space elements are controlled to set the working space conditions such that the optimum amount of energy is saved provided that the robots can still operate appropriately under those conditions.

Although motion sensors have been developed which could detect movements by detecting heat signals, ultrasonic signals or microwave signals, these sensors cannot distinguish between human workers and robots.

In addition to controlling working space conditions, another application requiring appropriate distinction between human beings and other objects includes intrusion control of the space. Intrusion control relates to safety conditions set for a working place.

Document U.S. Pat. No. 6,384,414 discloses a method and apparatus for detecting the presence of an object using one or more passive thermal radiation sensors, wherein thermal radiation from an object at a first wavelength and a second wavelength is detected. The signals are compared to a threshold condition that indicates whether an object is an intruder. The method and apparatus are said to enable differentiating humans from other objects or from other types of emitters.

The prior art method and apparatus use radiation properties of objects to judge whether an object is human or not. Although this works well if there is only one object in front of the sensors, in case of multiple moving objects in the environment the sensors only measure the mean temperature, making it difficult to decide on the presence of a human being. For example, the average temperature of a cool machine object and a hot machine object may be close to human temperature. Accordingly, to discriminate between human movements in factory workshops with a lot of background noise and other object movement, it is difficult to achieve a high hit rate and low false alarm simultaneously using radiation properties only.

Thus, there is a need in the art for an improved detection system capable of distinguishing between human objects and other objects, particularly machine-type objects.

SUMMARY OF THE INVENTION

It is an object of the present disclosure to provide a less complex yet effective system and method to detect objects, such as human beings, by distinguishing between such objects and objects moving in a predefined manner.

To that end, in one aspect, a detection system is disclosed that is configured for distinguishing a moving living object, e.g. a human being, from a moving machine object in a space. The machine object is assumed to move in a predefined manner, i.e. most of the time the motion of the object is not random but follows a predefined, e.g. pre-programmed, pattern, e.g. a repetitive pattern. An example of such an object is a robot that is programmed to perform particular duties during manufacturing.

The system comprises an imaging apparatus configured for producing a plurality of images over time of at least a part of the space. The images have a good spatial resolution. The value of the spatial resolution depends on local conditions, such as size of the space and the (expected) number of moving objects. As an example, a camera having 10 megapixels or more would generally be sufficient.

The system also comprises a processor configured for determining motion signals of the moving living object and the moving machine object from the plurality of images, wherein the motion signals are indicative of a motion in the space of the living object and the machine object. The processor is configured to transform the motion signals to a frequency domain and distinguish in the frequency domain between motion signals related to moving living objects and motion signals related to moving machine objects. Accordingly, the system is enabled to detect at least one of the living object and the machine object in the part of the space on the basis of the distinguished motion signals.

Another aspect of the disclosure relates to a method of detecting such moving objects in a space. A plurality of images over time of at least a part of the space is produced. From the plurality of images motion signals of a moving living object and a moving machine object are determined in the at least part of the space, wherein the motion signals are indicative of a motion in the space of the living object and the machine object. The motion signals are transformed to a frequency domain and at least one of the living object and the machine object are detected by distinguishing between a motion signal related to the moving living object and a motion signal related to the moving machine object in the frequency domain.

Further disclosed aspects relate to a space control system and corresponding method, comprising, respectively, such a detection system and method of detecting. Space elements regulating the conditions in the space, such as illumination, ventilation, heating, intrusion protection, are controlled on the basis of the detection results from the detection system and method of detection.

Other disclosed aspects relate to a computer program comprising software code portions configured for, when run by a processor, executing the method and to a non-transitory computer readable storage medium containing the computer program.

The above aspects are founded on the insight that living objects move in a relatively arbitrary manner, whereas movement of machine type objects is predefined, i.e. less arbitrary. As a consequence, transforming motion signals monitored in the space with an imaging apparatus of sufficient spatial resolution yields sufficiently distinct motion patterns in the frequency domain, such that motion of the living objects may be distinguished from motion of the machine type objects. Accordingly, detection of either one of the living objects and the machine type objects can be performed on the basis of distinguishing the motion signals in the frequency domain. Such detection provides high hit rates and low false detection.

It should be appreciated that the detection system may be implemented in a single system, such as a camera device, or that components of the system, such as the imaging apparatus and the processor, may be distributed over a plurality of devices.

In an embodiment of the detection system, the imaging apparatus comprises a thermal sensor, e.g. a thermal camera. More accurate detection is obtained with imaging apparatus having good spatial resolution. Thermals sensors have an appropriate spatial resolution. However, other imaging apparatus acquiring other types of raw data, such as PIR or ultrasound sensors may also be applied, provided that the spatial resolution is sufficient for the aimed purpose.

In an embodiment of the detection system and method of detection, an output is provided for controlling one or more controllable space elements, such as lighting elements, heating elements, ventilation elements and intrusion detection elements in dependence of whether motion signals in the frequency domain related to moving living object is detected. The output signal from the detection system may e.g. control illumination elements to increase the light intensity and/or to adapt the illumination spectrum when moving living objects are detected.

In an embodiment of the detection system and method of detection, storage is provided for storing an initial state of the space using one or more of the following initial measurement results:

a frequency domain base level wherein the at least part of the space is substantially empty of moving living objects and wherein the machine object in the space is absent or stationary;

a frequency domain machine object motion recording, wherein the at least part of the space is empty of moving living objects and wherein the machine object moves in the predefined manner;

a frequency domain living object motion recording, wherein the living object moves in the at least part of the space and the machine object is absent or stationary.

The processor is configured to use the initial state from the storage to distinguish in the frequency domain between the motion signals related to moving living objects and motion signals related to moving machine objects. Storage of the initial state of the space in the frequency domain provides for a calibration of the system to build up a decision network. After the calibration, the decision network of the system and method can figure out whether registered motion signals relate to living object movement or machine type movement in the monitored part of the space.

In an embodiment of the detection system and method of detection, the space comprises at least one space element controllable by the living object and feedback is received by the system of control actions by the living object of the space element and to adjust a detection state of the detection system in dependence of the feedback. The initial state of the system obtained by calibration may not be fully accurate and the decision network may be optimized through learning from feedback obtained via control actions of the living objects, e.g. the human workers.

The initial state and subsequent detection states are states defined by weights assigned to particular features in the frequency domain of motion patterns of at least one of the living object and machine object. In the initial state, weights are assigned to one or more of these features during calibration and one or more of these weights are adapted later in a detection state on the basis of the feedback. That is to say that the detection system may be self-adaptive in order to be capable of operating in different spaces and under different conditions.

It is noted that the invention relates to all possible combinations of features recited above. Thus, all features and advantages of one of the above-disclosed aspects likewise apply to any of the other disclosed aspects.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
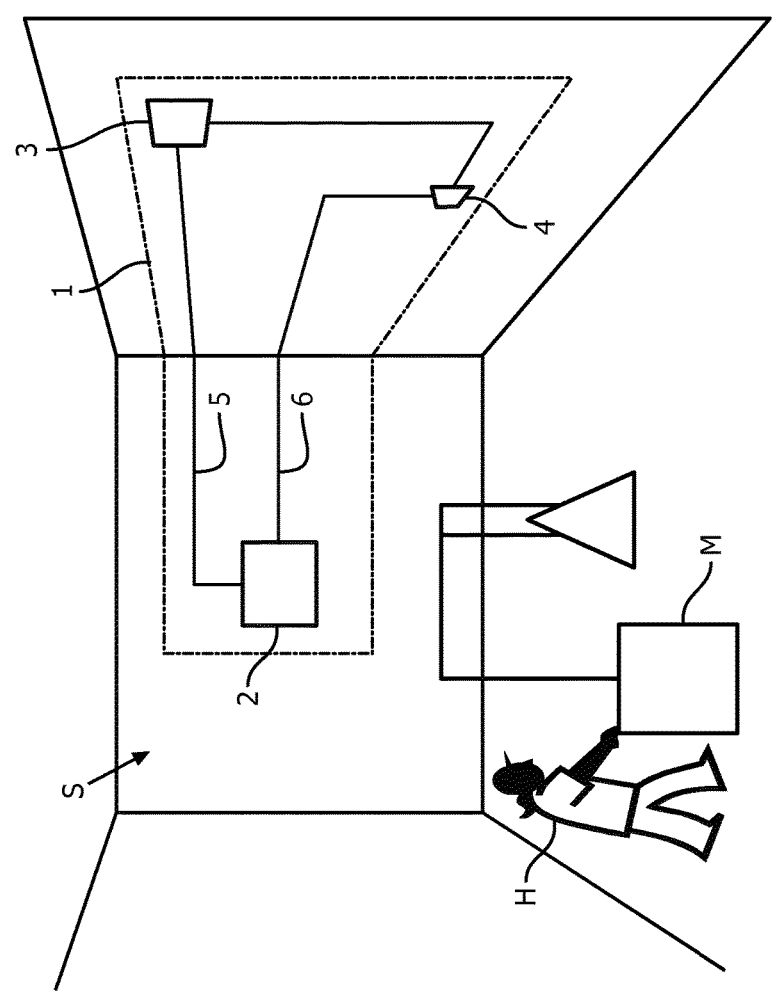
FIG. 1 is a schematically illustration of a working environment containing a human object and a machine object wherein a space element control system is installed.

Embodiments of the detection system and space control system will now be described more fully hereinafter with reference to the accompanying drawings. The systems may, however, be embodied in many different forms and the scope of protection should not be construed as limited to the embodiments set forth herein; rather, these embodiments are provided for thoroughness and completeness, and to fully convey the scope of the disclosure to the skilled addressee. Like reference characters refer to like elements throughout the description.

FIG. 1 is a schematically illustration of a working environment having a space S containing a living object, here human worker H, and a machine type object M, here a machine performing a manufacturing step on a conveyor belt (not shown). It should be noted that working space S may contain a plurality of living objects and machine type objects. Other kinds of living objects may include animals of sufficient size.

Machine type object M may perform a variety of activities, independent of any human interaction, related to manufacturing. The activities to be performed by machine type object M are predetermined and, accordingly, movements of the machine type object are predetermined, i.e. not arbitrary. Machine type object M may comprise a robot, e.g. an industrial robot.

Working space S comprises a space element control system 1 comprising a detection system 2, a controllable space element 3 and a manual controller 4. Working space S is monitored by detection system 2.

Controllable space element 3 may represent a single element or a plurality of elements. The space element 3 controls a condition for the space S, such as illumination, heating, ventilation or the intrusion detection state. The space element is controllable by human worker H using controller 4. Of course, controller 4 may come in a variety of implementations, including a remote control.

Detection system 2 controls space element(s) 3 via output control line 5 as will be explained for an embodiment in further detail below. Detection system 2 also receives feedback from control action by human worker H operating controller 4 via feedback line 6.

Figure 2:
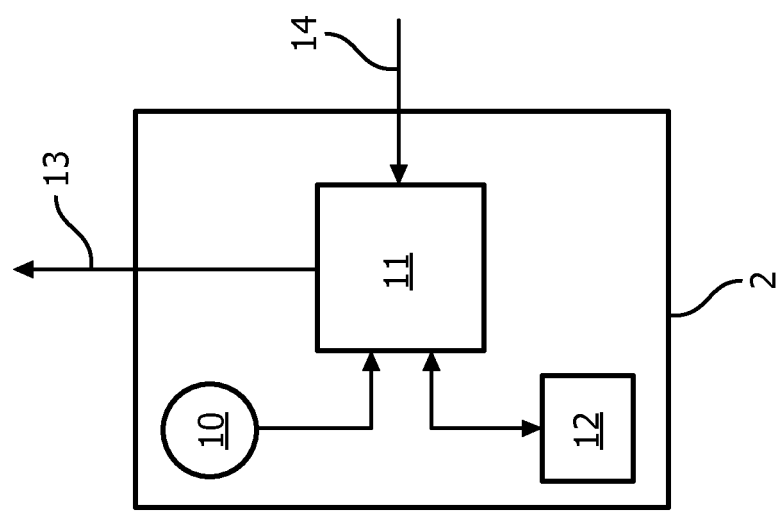
FIG. 2 is a schematically illustration of an embodiment of a detection system.

FIG. 2 is a schematically illustration of a detection system 2. Detection system 2 may be a smart camera. The detection system 2 comprises an imaging apparatus 10 connected to a processor 11. The imaging apparatus 10 is configured for producing a plurality of images over time of at least a part of the space S. Imaging apparatus 10 may comprise a thermal sensor or a thermal camera.

The detection system 2 also comprises storage 12, a control output 13, and a feedback input 14. Control output 13 may be connected to control output line 5 and feedback input may be connected to feedback line 6. Accordingly, detection system 2 may control operation of controllable space elements 3 and process feedback on the control actions from controller 4.

Figure 3:
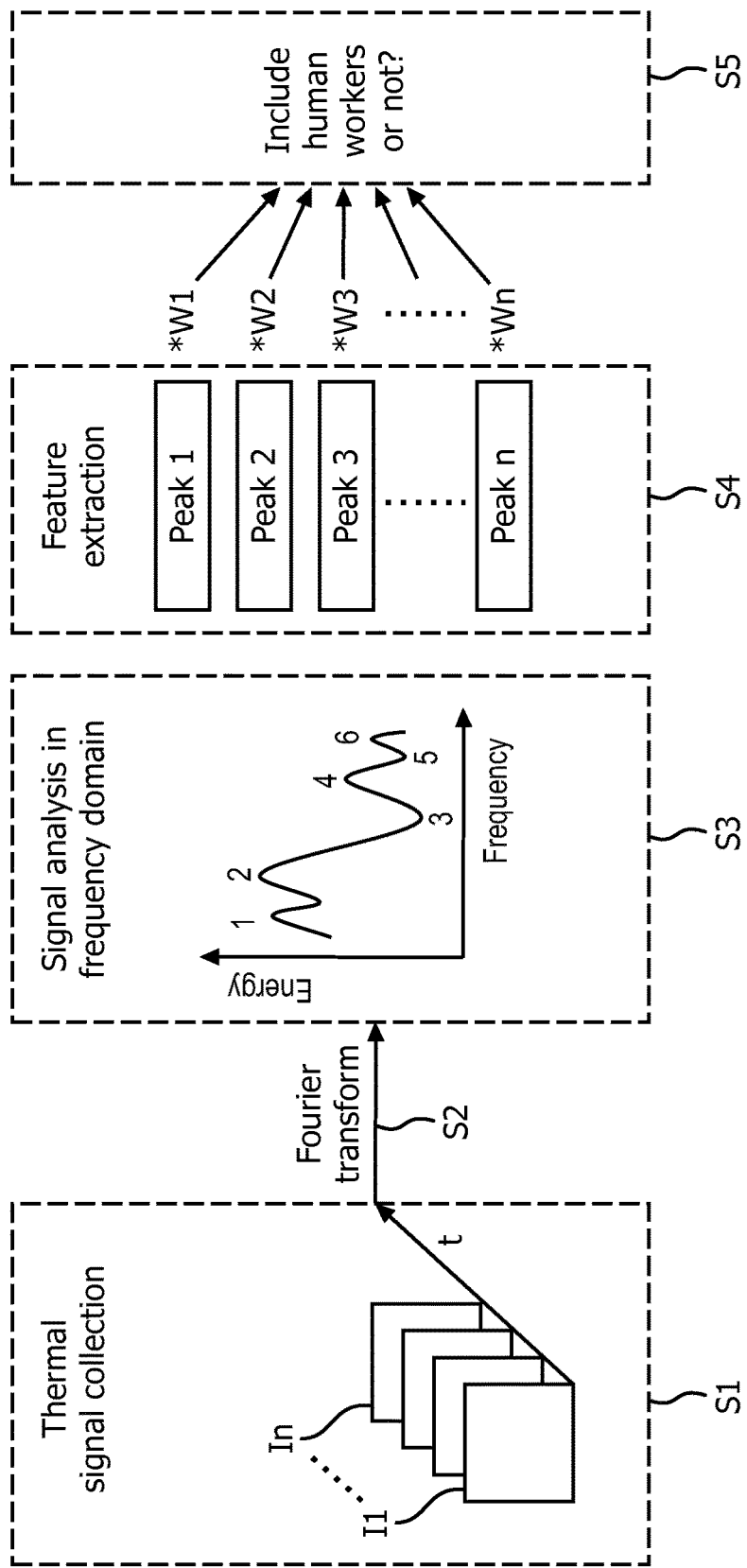
FIG. 3 illustrates a few steps of the detection system to detect the presence of a human worker in the working environment.

FIG. 3 illustrates a few steps of the detection system to detect the presence of a human worker H in the working space S. It should be noted that one or more of these steps are performed by software code portions (e.g. an algorithm) executed by the processor 11 on the input data from imaging apparatus 10.

In a first step S1, thermal camera 10 produces a plurality of images I1, . . . , In over a certain time period (time indicated by t) of at least a part of the space S and processor 11 collects the thermal images. The spatial resolution of the images is such that processor 11 is capable of determining motion signals from the plurality of images of the human worker H and the machine type object M.

The motion signals detected from the plurality of images are transformed to the frequency domain by the processor 11 performing a Fast Fourier Transform procedure FFT on the input data in step S2 in a manner known as such.

Figure 4:
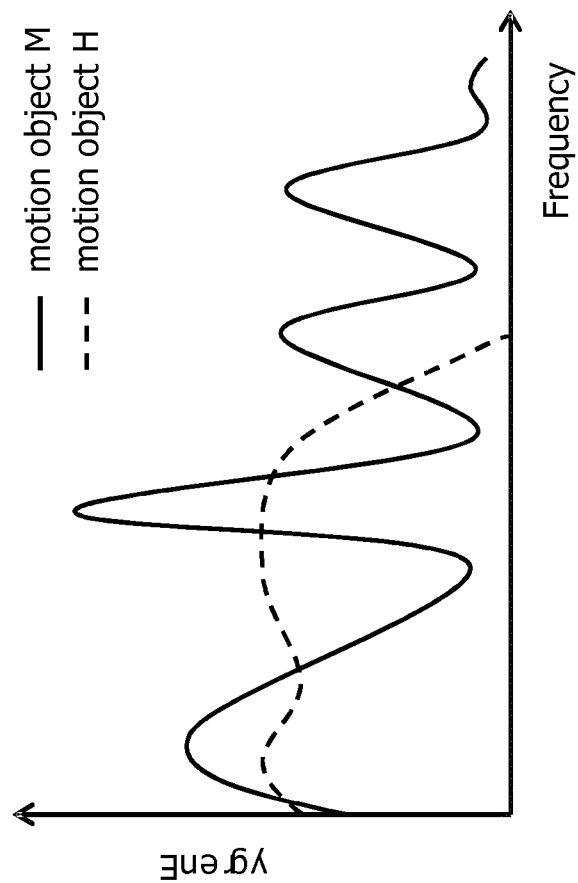
FIG. 4 is a typical frequency domain transform representation of motion signals of human workers and robots in a working space monitored by the detection system of FIG. 2.

Since the machine type object M moves in a less arbitrary manner than human worker H, the motion signals in the frequency domain are significantly different from each other as can be observed from FIG. 4. Since movements of machine type objects are pre-defined and fixed, their motion signals are concentrated in several critical frequency bands (solid lines in FIG. 4). In contrast, human movements are random which are relatively uniformly distributed in the frequency domain (dashed line in FIG. 4). In addition, due to the physiological characteristics of human beings, there is an upper frequency limit of movements (see the cut-off point in the dashed line). Accordingly, detection of either one of the living objects and the machine type objects can be performed on the basis of distinguishing the motion signals in the frequency domain.

The result of the FFT is shown in step S3 and signal analysis can be performed on the result to yield a variety of peaks in step S4. Since the individual contributions of motion of a human worker H and a machine type object M are known (e.g. from a calibration step, see below; see also FIG. 4), individual contributions from movement of human worker H and machine type worker M may be distinguished and the presence of a human worker H and/or a machine type object M may be detected from the signal in the frequency domain in step S5. Weights Wi (I=1, . . . , n) may have been determined for peaks in the signal result and used to increase accurateness as will be explained below. The detection result may be used in the space control system 1 to control operation of the space element 3, e.g. illumination. For example, the detection system increases or decreases illuminance to offer a good lighting condition for human workers H and dim lighting when only robots M are there.

A still further detailed embodiment of a space control system 1 and a detection system 2 will now be discussed with reference also to FIGS. 5 and 6.

Figure 5:
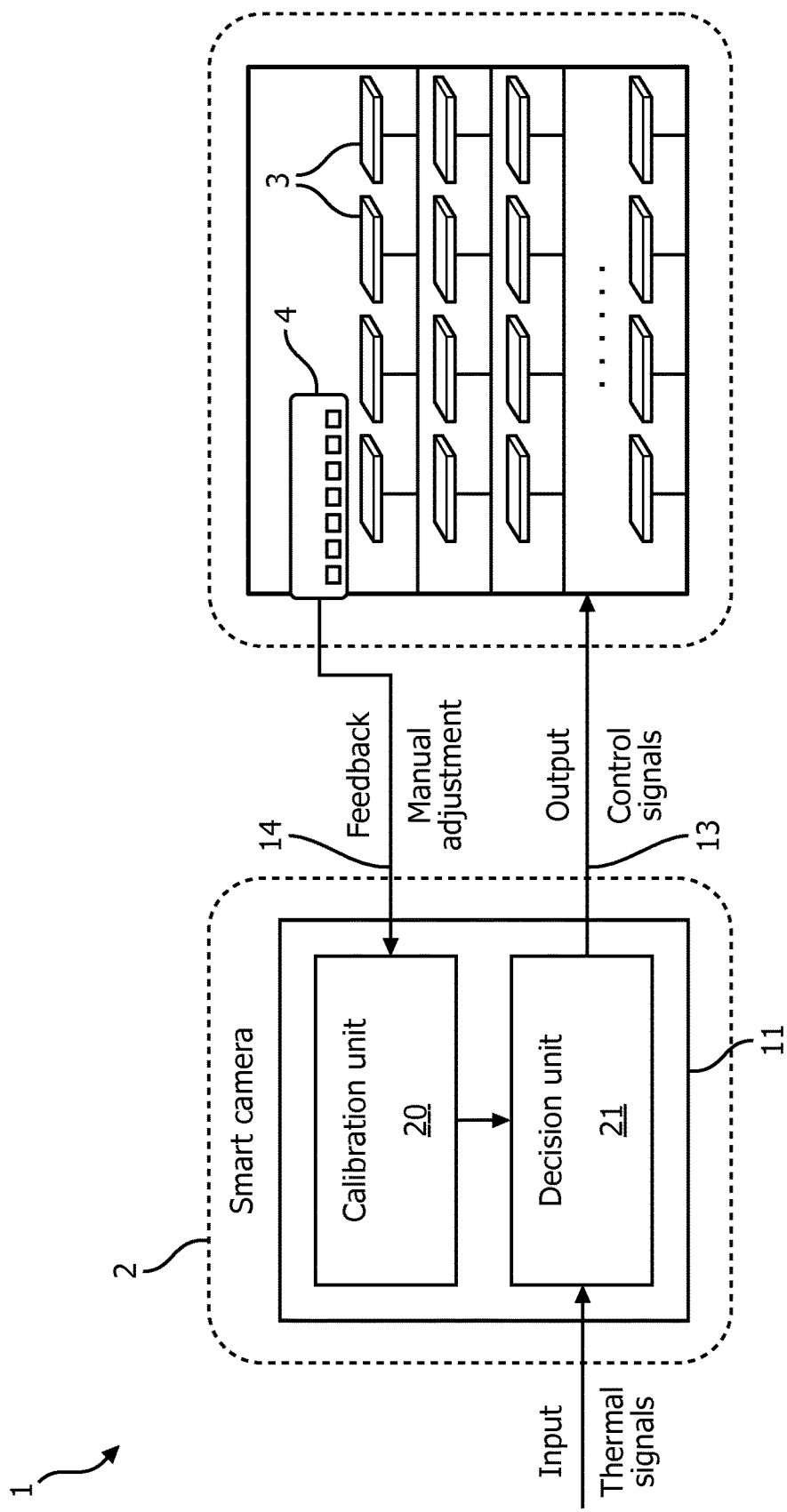
FIG. 5 is a schematically illustration of a detection system cooperating with a plurality of space control elements.
Figure 6:
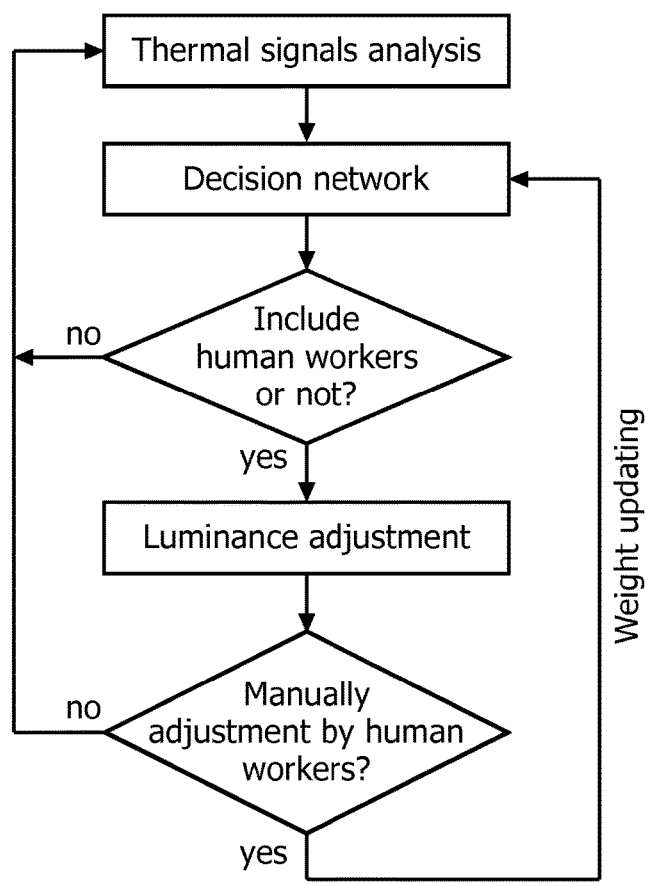
FIG. 6 is a flow chart illustrating a manner of optimizing the detection state of the detection system through machine learning based on feedback.

FIG. 5 is an illustration of a detection system 2 constituted as a smart camera. The smart camera 2 collects environmental heat information to classify movement patterns based on a decision network and sends the control output signals to adjust the intensity of luminaries 3 in dependence of detecting human workers H and machine type objects M. The intensity of luminaires can also be manually adjusted by workers H through the control panel 4. The adjustments are sent back to the smart camera 2 to optimize the decision network via feedback input 14.

Before using the smart camera 2, the smart camera 2 may run an initial calibration which measures the heat signals of environment, machine type objects M and human workers H respectively to build up a decision network (an initial state). To that end, the camera 2 contains a calibration unit 20. The calibration unit enables the detection system to be used in a particular working space S. First, the camera 2 collects the base level of thermal signals in that space. Second, since machine type object M movements are pre-defined, their movement traces are input to the camera without human workers being present. Finally, human workers H to do their regular work and the thermal signals of their movements are registered. Through these measures, the camera 2 acquires thermal signals distribution in three states: no movement, robot movements and human movements. Accordingly, the initial state is known and weight factors Wi to be applied can be determined.

After calibration, the camera 2 uses a decision unit 21 comprising a decision network to classify whether a movement is performed by human workers H or machine type objects M, such as robots. Due to different distribution of signals in the frequency domain between human and robot movements as illustrated with reference to FIG. 4, the decision unit 21 can figure out whether signals contain components from human workers H. In particular, the decision unit 21 samples several feature frequencies and assigns weights to these features to build up a decision network. The final output of the decision network decides whether human workers are involved or not and whether, if any, output control signals should be sent to space elements 3.

The original calibration may not be optimal. The camera may therefore run a routine as schematically illustrated in FIG. 6. When the camera 2 is running, the decision network in decision unit 21 may be optimized through a machine learning algorithm, e.g. using a support vector machine, to adjust the weights applied in the decision unit 21 when the camera is running to obtain a new detection state. As mentioned above, the space control system 1 offers a control panel 4 allowing human workers H to manually adjust the light levels of the luminaires 3 if they feel luminance is not enough. These adjustments are sent back to the calibration unit 20 as feedback signals, such that the camera 2 is informed that the luminance offered does not satisfy the human visual system. Accordingly, the camera 2 updates the weights Wi in the decision network using support vector machine algorithm. With the optimization, the decision unit 21 can be self-adapted and work stably in various environments for a long-term period.

The person skilled in the art realizes that the present invention by no means is limited to the preferred embodiments described above. On the contrary, many modifications and variations are possible within the scope of the appended claims.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A detection system configured for distinguishing a moving living object from a moving machine object in a space, wherein the machine object moves in a pre-defined and fixed manner, the system comprising:
    an imaging apparatus configured for producing a plurality of images over time of at least a part of the space;
    a processor configured for obtaining and determining motion signals of the moving living object and the moving machine object from the plurality of images, wherein the motion signals are indicative of a motion in the space of the living object and the machine object;
    wherein the processor is further configured for transforming the motion signals to a frequency domain by performing a Fast Fourier Transform (FFT) procedure and distinguish in the frequency domain between motion signals related to moving living objects and motion signals related to moving machine objects and for detecting at least one of the living object and the machine object in the part of the space on the basis of the distinguished motion signals, wherein motion signals that are concentrated in frequency bands are indicative of a machine object, and wherein motion signals that are uniformly distributed are indicative of a living object.

2. The detection system according to claim 1, wherein the imaging apparatus comprises a thermal sensor.

3. The detection system according to claim 1, wherein the system comprises an output for controlling one or more controllable space elements in dependence of whether motion signals in the frequency domain related to moving living objects are detected, the one or more controllable space elements comprising lighting elements, heating elements, ventilation elements, and intrusion detection elements.

4. The detection system according to claim 1, further comprising storage for storing an initial state of the space using one or more of the following initial measurement results:
    a frequency domain base level wherein the at least part of the space is substantially empty of moving living objects and wherein the machine object in the space is absent or stationary;
    a frequency domain machine object motion recording, wherein the at least part of the space is empty of moving living objects and wherein the machine object moves in the predefined manner;
    a frequency domain living object motion recording, wherein the living object moves in the at least part of the space and the machine object is absent or stationary;
    wherein the processor is configured to use the initial state from the storage to distinguish in the frequency domain between the motion signals related to moving living objects and motion signals related to moving machine objects.

5. The detection system according to claim 1, wherein the space comprises at least one space element controllable by the living object, wherein the detection system is further configured for receiving feedback of control actions by the living object of the space element and to adjust a detection state of the detection system in dependence of the feedback.

6. A space control system comprising one or more controllable space elements and the detection system according to claim 1, wherein the detection system is configured for detecting a living object on the basis of distinguishing motion signals related to the living object in the frequency domain and wherein the space control system is configured for controlling the controllable space elements in dependence of detecting the living object.

7. The space control system according to claim 6, comprising a least one element controller configured to enable control of the one or more controllable space elements by the living object, wherein the space control system is further configured for providing feedback to the detection system in dependence of feedback of control of the one or more controllable space elements through the element controller to adjust a detection state of the detection system.

8. A method of detecting moving objects in a space, the method comprising the steps of:
   producing a plurality of images over time of at least a part of the space;
   obtaining and determining from the plurality of images motion signals of a moving living object and a moving machine object in the at least part of the space, wherein the moving machine object moves in a predefined manner and wherein the motion signals are indicative of a motion in the space of the living object and the machine object;
   transforming the motion signals to a frequency domain by performing a Fast Fourier Transform (FFT) procedure; and
   detecting at least one of the living object and the machine object by distinguishing between a motion signal related to the moving living object and a motion signal related to the moving machine object in the frequency domain, wherein a motion signal that is concentrated in frequency bands is indicative of a machine object, and wherein a motion signal that is uniformly distributed is indicative of a living object.

9. The method according to claim 8, further comprising the steps of providing an output signal for controlling one or more controllable space elements in the space, such as lighting elements, heating elements, ventilation elements and intrusion detection elements in dependence of whether motion signals in the frequency domain related to moving living objects are detected.

10. The method according to claim 8, further using an initial state of the space to distinguish in the frequency domain between the motion signals related to moving living objects and motion signals related to moving machine objects, wherein the initial state has been obtained from one or more initial measurement results, including one or more of:
   a frequency domain base level wherein the at least part of the space is substantially empty of moving living objects and wherein the machine objects in the space is absent or stationary;
   a frequency domain machine object motion recording, wherein the at least part of the space is empty of moving living objects and wherein the machine objects moves in the predefined manner;
   a frequency domain living object motion recording, wherein the living objects move in the at least part of the space and the machine objects are stationary.

11. The method according to claim 8, wherein the space comprises at least one space element controllable by the living object, further comprising the steps of receiving feedback signals of control actions by the living object of the space element and adjusting a detection state of the detection system in dependence of the feedback signals.

12. A method of controlling space elements of a space, comprising the steps of the method of detection according to claim 8 and controlling one or more space elements in dependence of detecting the living object.

13. The method according to claim 12, further comprising the step of generating feedback signals by at least one element controller upon operation of the element controller by the living object and for adjusting a detection state of a detection system for detecting the living object in dependence of the feedback signals.

14. A non-transitory computer-readable storage medium storing a computer program product comprising software code portions configured to, when executed on processor, perform the method according to claim 8.

* * * * *